Jan. 8, 1963  E. T. PRICE ET AL  3,071,853
METHOD AND APPARATUS FOR MAKING BRAZED HONEYCOMB
Filed Oct. 17, 1955  13 Sheets-Sheet 1

INVENTORS
GEORGE D. CREMER
FRANK J. FILIPPI
JOHN V. LONG
EDMUND T. PRICE
BY
ATTORNEYS

Jan. 8, 1963     E. T. PRICE ET AL     3,071,853
METHOD AND APPARATUS FOR MAKING BRAZED HONEYCOMB
Filed Oct. 17, 1955     13 Sheets-Sheet 2
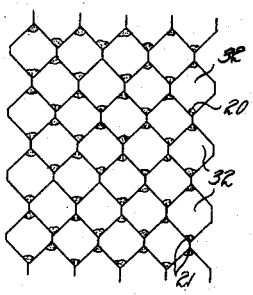
Fig. 4
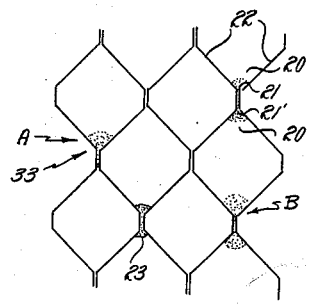
Fig. 5
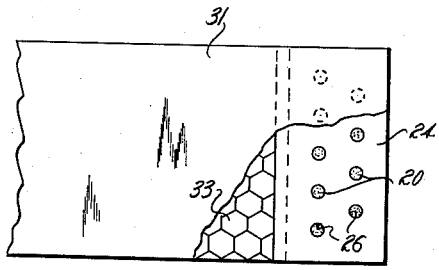
Fig. 6
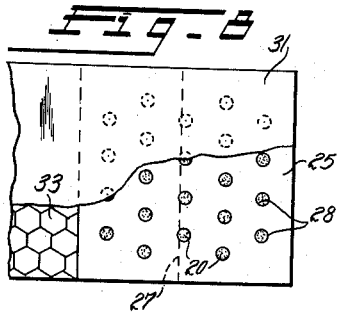
Fig. 8
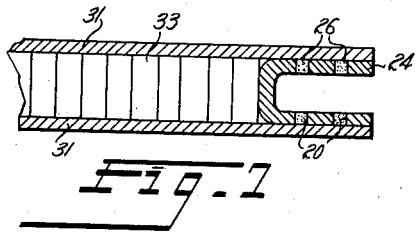
Fig. 7
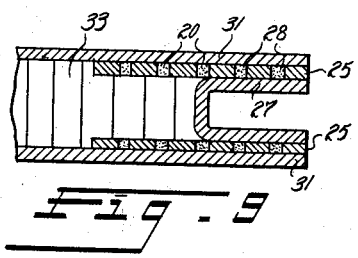
Fig. 9
INVENTOR
GEORGE D. CREMER
FRANK J. FILIPPI
JOHN V. LONG
EDMUND T. PRICE
BY
ATTORNEYS INVENTORS
GEORGE D. CREMER
FRANK J. FILIPPI
JOHN V. LONG
EDMUND T. PRICE
BY Strauch, Nolan & Diggins
ATTORNEYS Jan. 8, 1963     E. T. PRICE ET AL     3,071,853
METHOD AND APPARATUS FOR MAKING BRAZED HONEYCOMB
Filed Oct. 17, 1955     13 Sheets-Sheet 4

INVENTORS
GEORGE D. CREMER
FRANK J. FILIPPI
JOHN V. LONG
EDMUND T. PRICE
BY Strauch, Nolan & Diggins
ATTORNEYS

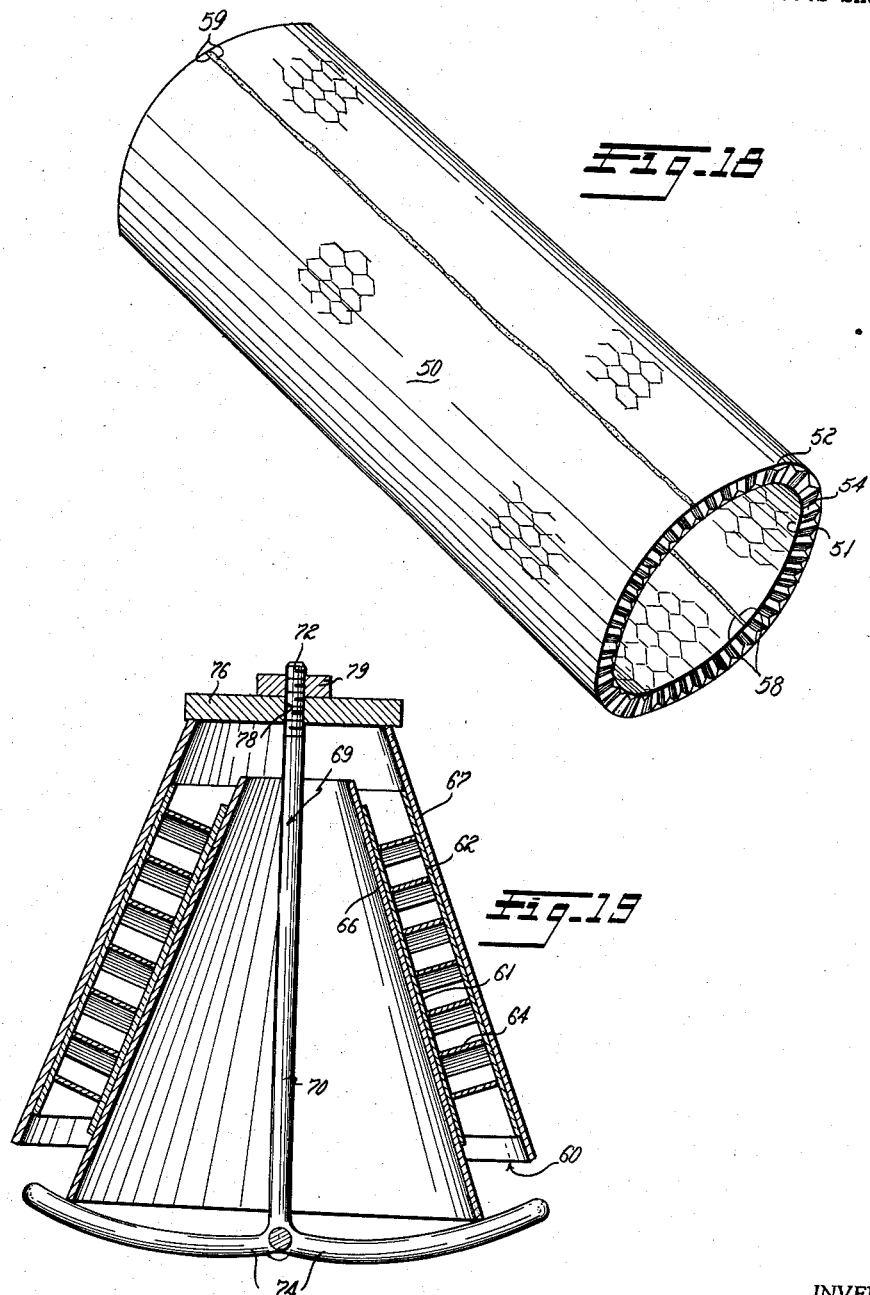

Jan. 8, 1963     E. T. PRICE ET AL     3,071,853
METHOD AND APPARATUS FOR MAKING BRAZED HONEYCOMB
Filed Oct. 17, 1955     13 Sheets-Sheet 6
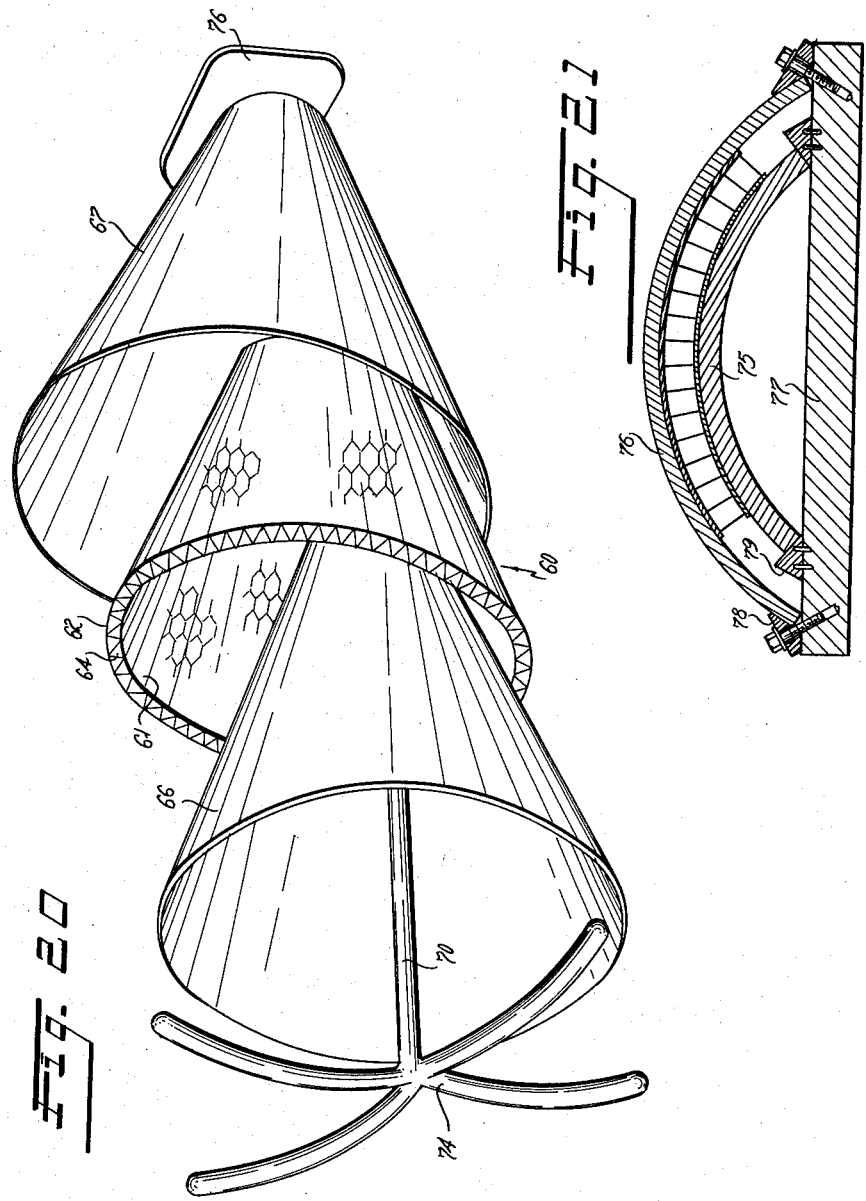
INVENTORS
GEORGE D. CREMER
FRANK J. FILIPPI
JOHN V. LONG
EDMUND T. PRICE
BY
ATTORNEYS

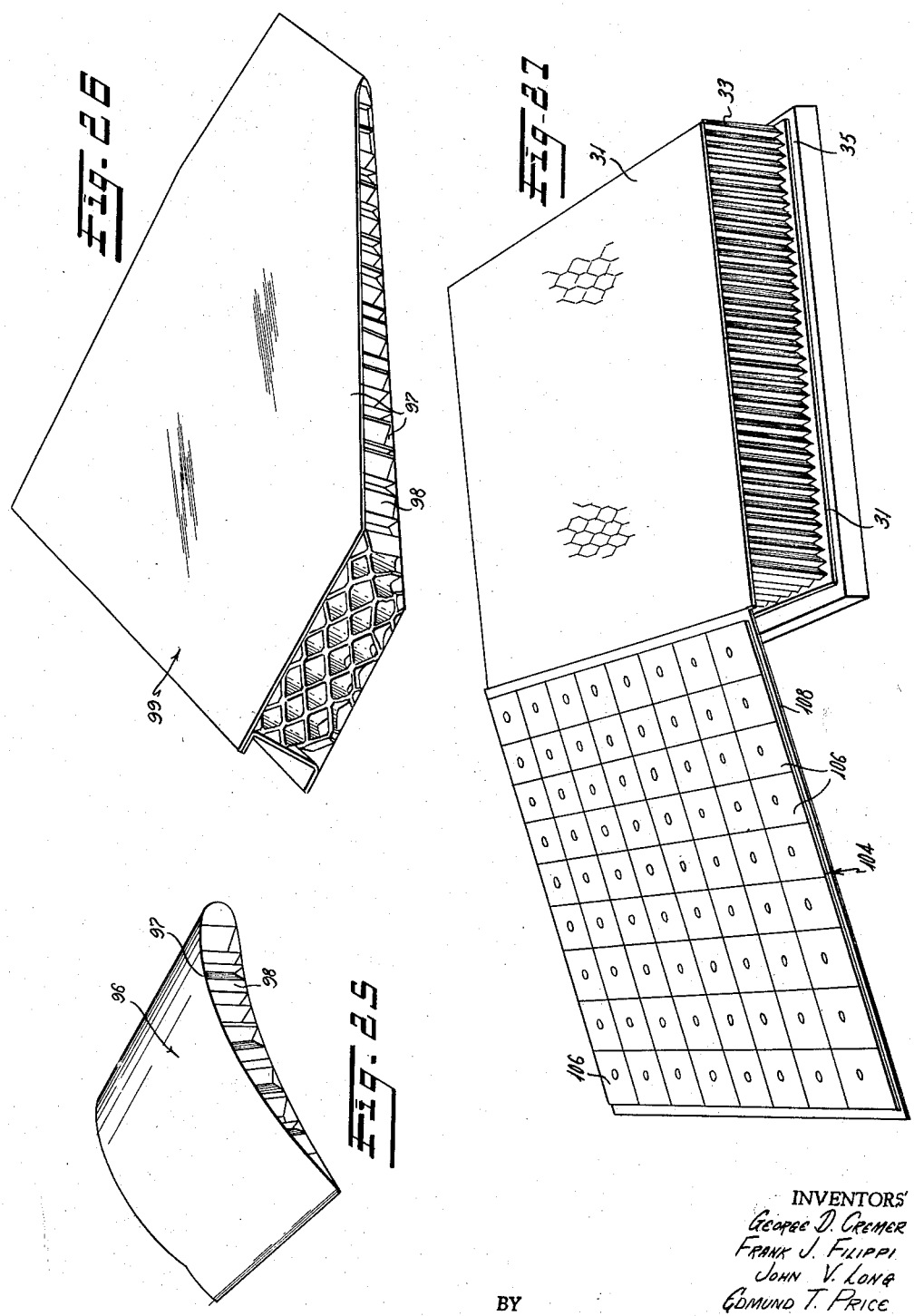

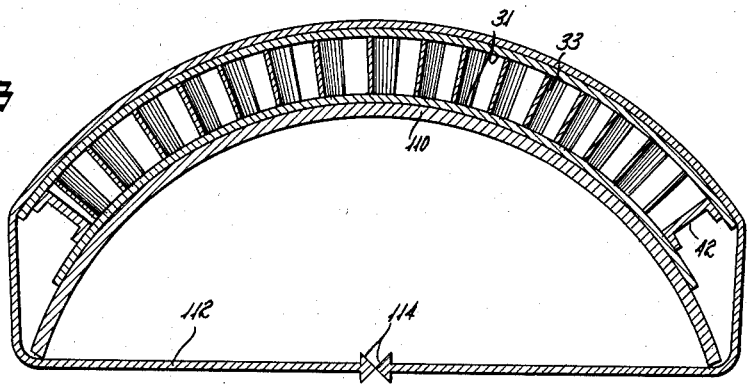
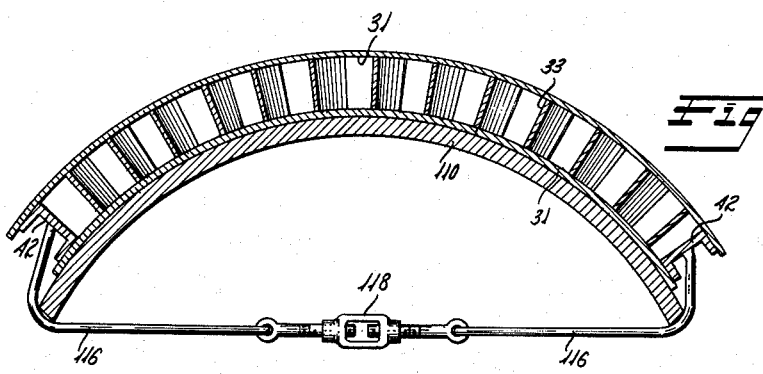
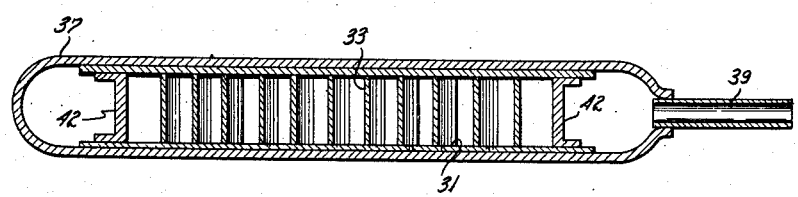
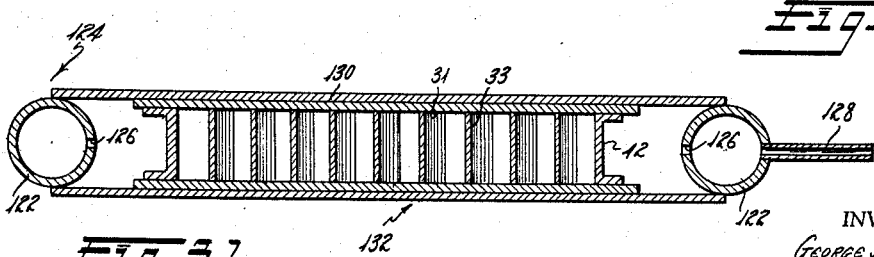

Jan. 8, 1963     E. T. PRICE ET AL     3,071,853
METHOD AND APPARATUS FOR MAKING BRAZED HONEYCOMB
Filed Oct. 17, 1955     13 Sheets-Sheet 10

INVENTORS
GEORGE D. CREMER
FRANK J. FILIPPI
JOHN V. LONG
EDMUND T. PRICE
BY
Strauch, Nolan & Diggins
ATTORNEYS

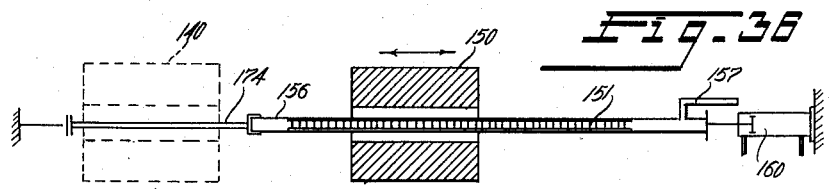
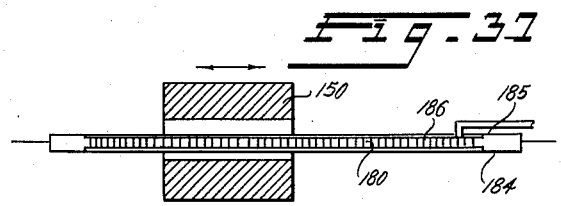
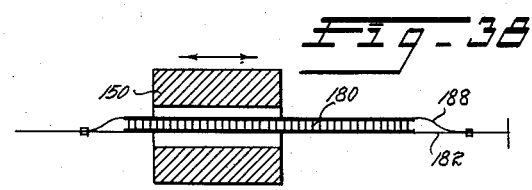
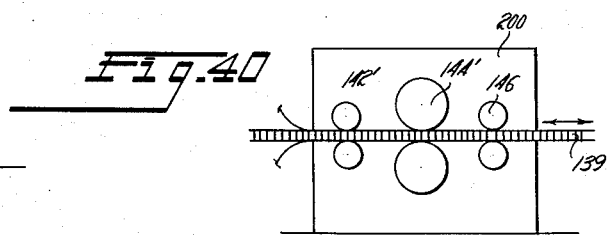
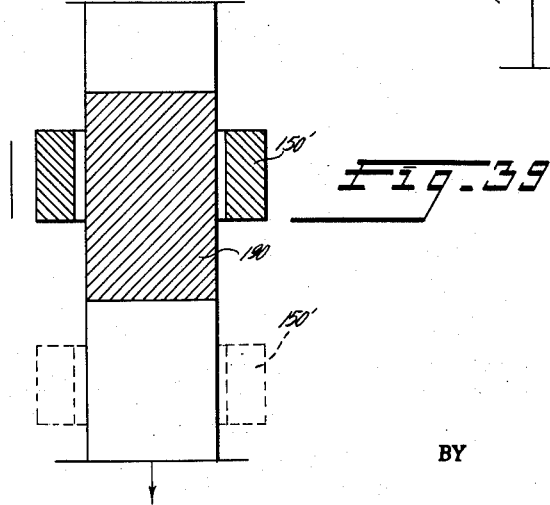

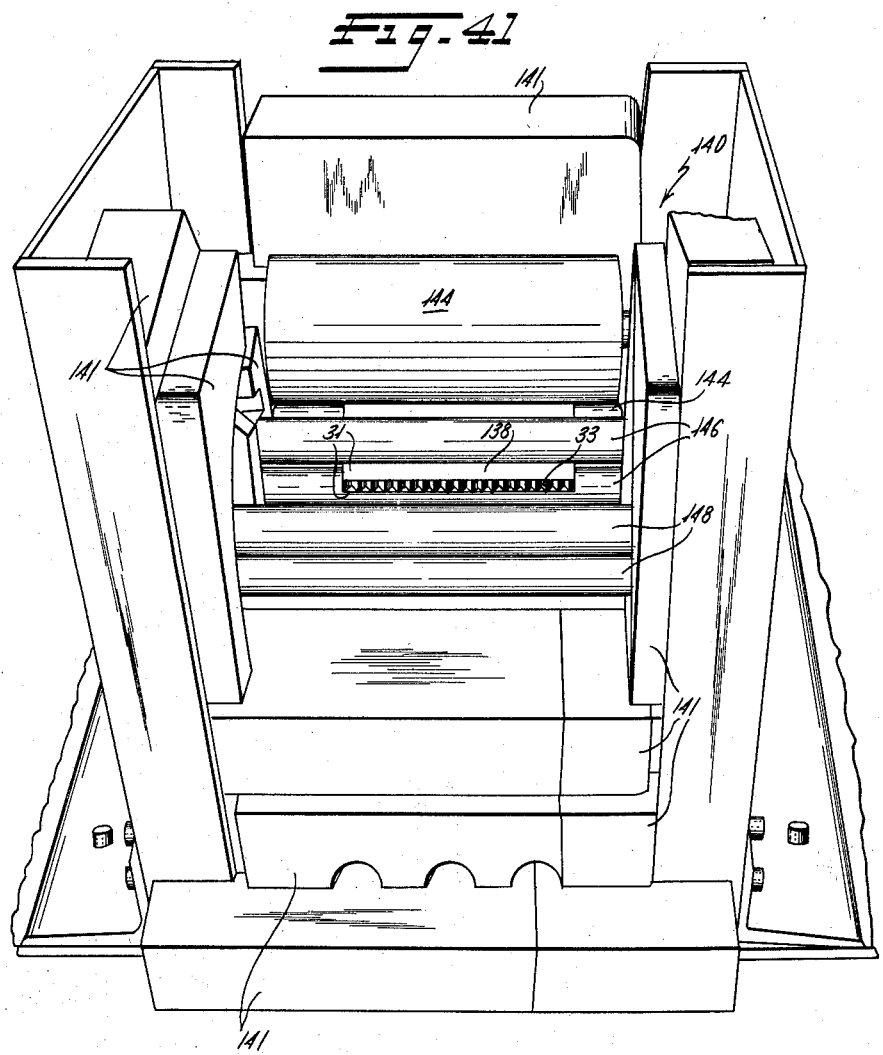

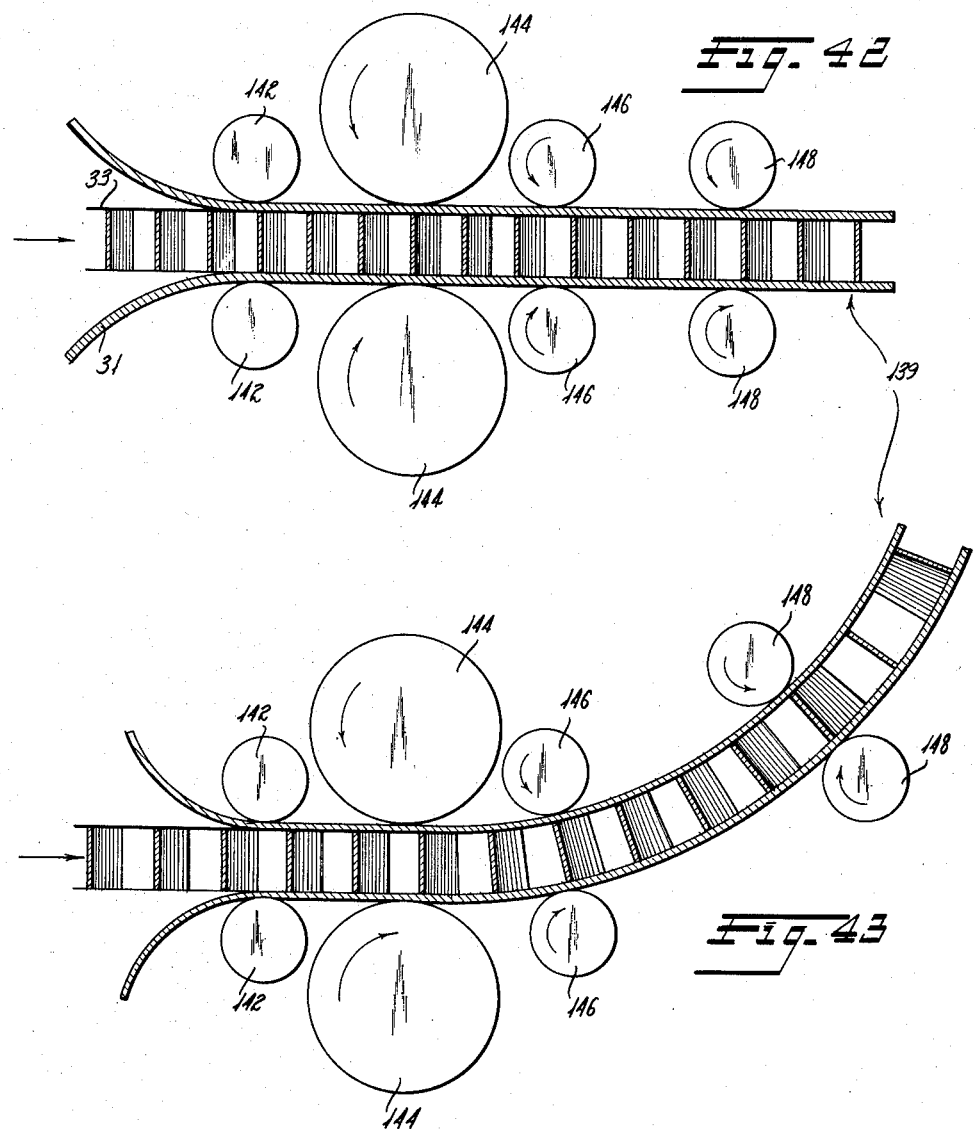

United States Patent Office 3,071,853
Patented Jan. 8, 1963

3,071,853
METHOD AND APPARATUS FOR MAKING BRAZED HONEYCOMB
Edmund T. Price, San Diego, George D. Cremer, Lemon Grove, and Frank J. Filippi and John V. Long, San Diego, Calif., assignors to Solar Aircraft Company, San Diego, Calif., a corporation of California
Filed Oct. 17, 1955, Ser. No. 540,974
4 Claims. (Cl. 29—471.1)

This invention relates to brazing in general, and more particularly to method and apparatus for brazing of face sheets or skins to honeycomb type core structures fabricated of thin metallic materials.

The term "honeycomb" used in reference to the sandwich core throughout the specification and claims is not limited to the natural honeycomb cell structure wherein each cell has six sides, but is intended to include cores having multiple cellular structure with the cell axes substantially perpendicular to the facing sheets of the sandwich and wherein each cell is divided from adjacent cells by a thin web, whether each cell cross section is triangular, square, diamond shape, etc.

Industry has engaged for many years in research for light-weight, high strength structural materials, particularly in the aircraft industry where minimum weight and maximum strength structures are essential. Considerable effort and money have been spent in recent years in the development and improvement of so-called honeycomb sandwices and like constructions which generally consist of a metallic honeycomb core structure interposed between a pair of sheet metal skins, with the skins being suitably bonded to the edges of the strips forming the cells of the honeycomb core. Such honeycomb sandwiches are used extensively in aircraft ducts, sheathing decks, bomb bay doors, bulkheads, etc.

The manufacture of metallic honeycomb core structures in a multitude of cell configurations and sizes has advanced to a high degree of perfection during the last decade. However, the problem of attaching and bonding these honeycomb core structures to the covering skins or face sheets to achieve sandwich construction satisfactory for use in service environments above about 500° F. has heretofore not been satisfactorily solved. Because the greatest advantage of honeycomb sandwich fabrications lies in their high strength-to-weight ratio, emphasis has been on the use of the thinnest possible sheet for the core and skins, thereby greatly increasing the assembly and bonding problems in producing such sandwich structures. In particular, previous known processes of bonding the core and skin parts have not realized the optimum possible strength characteristics of such constructions and have been especially inadequate for fabricating honeycomb sandwiches for high temperature applications.

Where no temperature considerations are involved, it has been found satisfactory in many cases to bond the skins to the core with phenolic resins or other organic adhesives. However, these adhesives all decompose or melt at low temperatures, and no organic adhesive has been satisfactory for applications involving sustained temperatures above about 500° F. In George Epstein's Adhesive Bonding of Metals published in 1954 by Reinhold Publishing Company, the author states on page 17, line 17, that "Even the best of the synthetic resin adhesives have maximum operating temperature ranges in the vicinity of 500° F. . . . ." This deficiency imposes a serious limitation on the use of such sandwich assemblies, tending to balance out their extremely desirable high strength and lightweight characteristics, especially in aircraft and missiles where high temperatures are frequently encountered.

Efforts to overcome the deficiencies of resin-bonded and like honeycomb sandwich by metallurgically joining the components have been made for almost two decades as evidenced by United States Patent No. 2,056,563 issued October 6, 1936, to E. G. Budd et al., which discloses a method of resistance welding sandwich structures. This method although satisfactory for relatively thick walled cells and skins, has proved impractical for the thin wall structures herein described, as have all other welding and brazing methods of our knowledge, with the exception of the method described and claimed in co-pending application for United States Letters Patent Serial No. 454,179 filed September 3, 1954, now abandoned, by George D. Cremer.

Notwithstanding increasing demand for all metal honeycomb sandwich, especially by leading aircraft manufactures, none was available until our invention made possible the satisfactory all-metal brazed honeycomb structures desired by aircraft designers. Our invention made possible an afterburner tailpipe shroud structure of thin skin honeycomb construction recently delivered to a major airframe manufacturer, for test on a recent advanced type jet aircraft. The structure has proved highly satisfactory in such tests at temperatures up to 900° F.

Failure to achieve satisfactory results in honeycomb sandwich structure by prior art brazing methods is due directly and principally to the practical difficulty of achieving and maintaining complete contact between the skin and the edges of the strips forming the core cells during the brazing cycle. This problem results from imperfections in skin and core as well as from distortion of the skin and the core due to thermal warpage during the brazing cycle. Consequently, when heretofore known methods of brazing are used, these conditions result in a failure to achieve a complete bond between the edges of many of the individual core cells and the skins in the finished sandwich so the structures contain substantial sections of core edge where the braze line is discontinuous. As a complete continuous bond between all core edges and the face skin of honeycomb sandwich structure is one of the primary factors responsible for its high strength, any such discontinuties of bonding result in undesirable loss of strength. Our invention contemplates apparatus for carrying out the novel process of brazing honeycomb sandwich in batch, semi-continuous or continuous production, and all embodiments of such apparatus assure the desired continuous bond between all core edges and the face skin of the honeycomb sandwich.

Accordingly, a primary object of the present invention is to provide novel methods of and apparatus for brazing which effectively solve the aforementioned problems and enable the brazing of honeycomb core structure and skins so that substantially the entire edge of each honeycomb core cell adjacent the face skin will be bonded to the skin by a virtually continuous and complete braze therebetween.

Another object of our invention is to provide a novel method of brazing honeycomb cell sandwich structures which can be used to produce individual structures of desired configuration and also to produce a continuous sheet of honeycomb sandwich structure.

A further object resides in the provision of novel apparatus used to accomplish the novel brazing method in producing both individual, semi-continuous and continuous structures.

Another object resides in the provision of novel apparatus, including a sealed envelope with controlled internal pressure, which utilizes the differential pressure existing between the inside envelope pressure and atmospheric pressure to achieve the present novel method of brazing for producing high strength articles of honeycomb sandwich structure having a wide variety of configurations.

A further object is to provide an apparatus for utilizing the novel method of brazing in producing a continuous strip of honeycomb sandwich.

Further novel features and objects of this invention will become apparent from the following detailed description and the appended claims taken in conjunction with the accompanying drawings showing various tools and articles of manufacture forming part of this invention, in which:

FIGURE 4 is a plan view of a section of honeycomb core showing the preferred placement of brazing alloy;

FIGURE 5 is a diagrammatic view illustrating loading of braze alloy at one and at two sides of a cell node, and illustrating in typical brazed node joint;

FIGURES 6, 7, 8 and 9 illustrate reinforcing edge channels and doubler plates provided with perforations for retaining braze alloy;

FIGURE 18 is a perspective view of a small all-metal cylindrical sandwich structure;

FIGURE 19 is an elevation view in section of the assembled dies, fixture and sandwich used to braze a truncated cone of honeycomb sandwich structure;

FIGURE 20 is a perspective disassembled view of an all-metal truncated honeycomb cone together with the matched dies and cone fixture shown in FIGURE 19;

FIGURE 21 is an elevation view in section of two bowed dies having different thermal expansion coefficients;

FIGURES 25 and 26 are perspective views of an all-metal brazed honeycomb airfoil and a wedge section sandwich structure respectively;

FIGURE 27 is a perspective view of a semi-flexible die plate modification which may be used in carrying out certain phases of our invention;

FIGURE 28 is an elevation view in section of a bowed die in combination with a tension sheet holding the sandwich in brazing position;

FIGURE 29 is an elevation view in section of a bowed die and sandwich assembled in brazing position in combination with a wire attached to end edge stiffeners fixed to the face skin of the sandwich;

FIGURE 30 is an elevation view in section of a metallic vacuum envelope and sandwich assembly with no dies;

FIGURE 31 is an elevation view in section of a tubular frame and metallic vacuum envelope assembled with a sandwich in brazing position;

FIGURE 36 is a diagrammatic view illustrating a traveling furnace for brazing an evacuated strip of honeycomb sandwich held under tension;

FIGURE 37 is a diagrammatic view similar to FIGURE 36 illustrating a honeycomb sandwich strip placed inside a partially evacuated envelope maintained under tension by a double rack arrangement;

FIGURE 38 is a diagrammatic view illustrating a traveling furnace utilizing a single rack member to support preassembled honeycomb structures;

FIGURE 39 is a diagrammatic view illustrating a method of brazing using a vertically positioned workpiece with a furnace also arranged to travel vertically up and down the work piece;

FIGURE 40 is a diagrammatic view illustrating a roller type stationary furnace for producing continuous honeycomb structure;

FIGURE 41 is a front perspective view of an apparatus utilizing roller units for producing continuous sandwich structure in accordance with certain phases of our invention;

FIGURE 42 is a schematic section view of the continuous process roller apparatus of FIGURE 41 arranged to produce flat sandwich, the sandwich occupying the correct position for brazing operation; and FIGURE 43 is a schematic section view of the continuous process roller apparatus of FIGURE 25 arranged to produce curved sandwich, the sandwich occupying the correct position for brazing operation.

It will be understood that the relative thicknesses of core walls and face sheets illustrated in the various figures are exaggerated to show the various assemblies and jigs. In actuality this invention is applicable to sandwich structure with wall thickness values as low as 0.0005".

Our improved methods for brazing a metallic honeycomb core to a face sheet to produce a virtually continuous bond between the honeycomb core cell edges and the abutting surface of the face sheet utilizes suitable tooling to achieve and maintain effective substantially continuous contact between core cell edges and skin and also provide the finished shape of the sandwich during the braze cycle thereby producing a strong, tight, substantially uniform and continuous bond between the core and skin. Several methods, apparatus for accomplishing the method, and articles produced thereby, all within the purview of the present invention, have been successfully developed, as will be hereinafter described.

Figure 1:
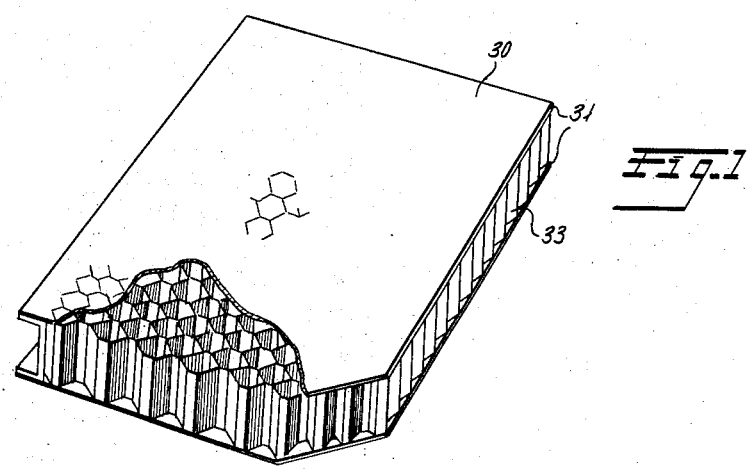
FIGURE 1 is a perspective view of a flat honeycomb sandwich structure made in accordance with this invention with part of the upper face sheet removed.

A preferred method of brazing flat plane sandwich structure 30 of FIGURE 1 according to our invention is based on the use of a pair of matched dies, mandrels, platens, or molds which are referred to hereinafter as dies. These dies are fabricated of material such as stainless steel, high alloy metals, or ceramic bodies which will resist or are treated to resist oxidation and possess desirable strength characteristics at the braze temperature encountered. Furthermore, the dies are preferably of uniform thickness to minimize thermal distortion, and of no greater thickness than is required to ensure relative rigidity at brazing temperature. We have found ¼" thick dies to be satisfactory for plane sandwiches at brazing temperatures of about 1900° F.

The term "brazing" is used broadly to refer to that type of fusible bonding which results in a cohesive bond such as obtained with solders, brazes, and the like metallic bonding methods, as distinguished from fusible adhesive bonding like that obtained in prior methods using glues, cements and phenolic resins.

The preferred steps in this method are as follows: The honeycomb core, the skins, and any reinforcing member and/or auxiliary members are cleaned, if necessary, in any conventional manner, as by acid dip. The cleaning step is optional, depending upon the condition of the components. When desired, core edge reinforcing members, such as channels, are rigidly attached to the core edges by suitable means like resistance welding. This attachment permits convenient handling of an otherwise flexible core and also greatly reduces core-edge damage during the brazing cycle by partially shielding the core from oxygen attack and/or direct radiation during furnace brazing. A suitable amount of an appropriate braze material may be placed in a number of the cells in a position of direct access to a node joint. Capillary action at brazing temperatures distributes the molten braze material to substantially all nodes of the core cells and all joints between the cells and face sheets. Any brazing material, including high temperature materials may be used. Silver braze is suitable for service temperature up to about 600° F., whereas braze materials such as those disclosed in copending application Serial Number 460,506 filed October 5, 1954, now Patent No. 2,856,281, should be used for high temperature-high strength applications. The braze material may be temporarily held in place by a suitable binder, such as a dilute polystyrene-methylchloride solution sprayed over the braze powder. Suitable flux may be applied to the core and inside of the skin surfaces. If a reducing atmosphere furnace is employed, flux may not be required. Other suitable means of applying the braze material, binder, and flux may be employed. The skins may be spot welded or attached by other suitable means at several points to the core edge members in order to form a unit that can be easily handled prior to brazing. This prepared unbrazed assembly is then pressed between the aforementioned dies.

Successful brazing is in part dependent on the placement of the braze alloy powder. A highly satisfactory placement is shown in FIGURE 4 with the powder 20 loaded along the open side of individual cells 32, rather than, for example by indiscriminately distributing random amounts of braze powder among the cells.

For example, if desired to limit the weight of the braze material in relation to the unbrazed assembly, the desired amount of braze powder 20 may be measured and placed equitably in the appropriate nodes 21. The powder may be held in place with any suitable binder, for example, acrylic resin, which may be sprayed over the positioned powder, or mixed with the powder into a paste prior to placement.

This system of specific placement or loading of the braze powder 20 on the core 33 only, permits the use of less braze material and, during the brazing cycle, the precisely positioned braze material will upon melting, confine the braze flow 23 in a manner to make bonding at the joint between core cell edges and face sheets and node joints only, rather than spreading over the cell walls. Such specific braze powder placement reduces the weight of the honeycomb sandwich and with the substantially continuous bond between core cell edges and face sheets realized by this invention permits use of the aforementioned very thin walled core material in a relatively light weight honeycomb structure having desirable high compressive, shear and tensile strength.

A typical example of braze powder loading would be: With the core 33 in an upright position, FIGURE 5, a precise amount of braze material 20 is placed in the open node area 21 at the bottom of each cell formed by two abutting core ribbons 22, and said braze material 20 is fixed in place by spraying on a binder. The work-piece may then be reversed in position, and an additional measured amount of braze powder 20 applied to the unloaded nodes 21 and also fixed with binder. The face sheet or sheets now are positioned, and the assembly is ready for brazing. An alternative and equally successful method is to form a paste of binder and braze powder, and apply this paste to the nodes in measured amount. Obviously, specific applications will govern preference for each of these methods of braze powder loading.

With reference to FIGURE 5, it will be understood that the braze powder 20 may be loaded on only one side A of each cell node or on both sides B. In either case the braze powder upon melting will thoroughly bond the nodes and joint between all walls and face sheets.

In many cases such as illustrated in FIGURES 6–9, when reinforcing strips, channels 24 and doubler plates 25 are utilized, brazing may be facilitated by providing the reinforcing element with perforations 26 which may be loaded with braze alloy powder 20 prior to assembly.

FIGURES 6 and 7 illustrate a perforated reinforcing channel 24. The braze material 20 may be placed in the perforations 26 and held with a binder, or binder and alloy may be mixed into a paste which then is introduced into the perforations 26. During the brazing cycle, the braze material melts and flows to permanently bond the channel 24 to the skins 31.

FIGURES 8 and 9 illustrate an arrangement of doubler plates 25 and a channel member 27, with the former perforated at 28 and braze loaded. Again, during the braze cycle, the braze alloy 20 will melt and flow to bond channel 27 to doublers 25 to skins 31 and core 33.

We have found that such lap type brazes are of consistently high quality when made by this method. Conventional brazing practice which does not employ perforations has been shown by us to be inconsistent, frequently resulting in numerous unbrazed areas.

Additional advantages of utilizing perforated lap strips, channel, and inserts are: Stiffer section for a given weight, relatively long lap areas are feasible to braze; tapered sheet or strip is easier to fabricate, and braze alloy placement is greatly simplified.

Perforations 26, 28 may be of any desired configuration, round, oblong, square, etc., and the open area may vary as desired. We have found that, depending on application, the open area may amount to from 5% to 70% of the auxiliary member.

We have also successfully utilized sintered metals to achieve flow and wetting of the braze powders. Embossed strips also are satisfactory, as are rolled screen and similar arrangements which provide the necessary auxiliary strength at light weight with perforations for the braze powders.

Figure 2:
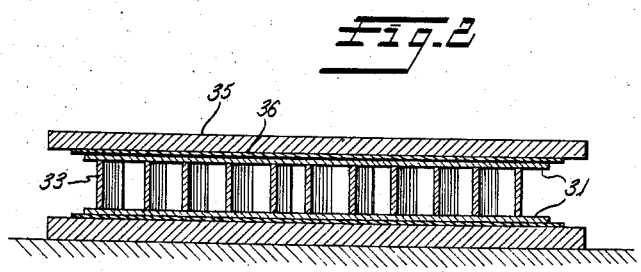
FIGURE 2 is a schematic elevation view in section of two flat dies, upper and lower resilient layers of asbestos or the like and the sandwich in assembled brazing position.

Referring to FIGURE 2, the thin skin or face sheets 31 are held in brazing contact with the core 33 by the dies 35. The temperature is increased until brazing is accomplished, then the assembly is uniformly cooled. Quick cooling by artificial means is desirable, primarily as a time-saving factor, but is not mandatory as satisfactory cooling can be accomplished without using artificial cooling means. In certain instances, if molten braze material is allowed to remain in contact with the base metal for longer than two or three minutes, excessive alloying and penetration may take place, thereby weakening the relatively thin sections of the sandwich structure. Non-uniform cooling may result in permanent distortion.

We have found that optimum sandwich structure is dependent on applying just enough heat to the sandwich, sufficient to melt and flow the braze material for brazing. It is imperative to have a minimum number and mass of pressure fixtures to enable rapid heating of the sandwich assembly and to negate such fixtures that "soak" up and retain heat, causing too much braze diffusion.

A pressure of ½ pound per square inch of sandwich area has been determined to be satisfactory for ¼" thick honeycomb sandwich structures made of Armco 17–7PH alloy with 0.005" thick face sheets and 0.002" core web thickness with core cell cross section the equivalent of a ¼" square design. A pressure of 2 pounds per square inch has been used for ¼" thick sandwich structure made of Armco 17–7PH alloy, .010" faces and .002" core web with cell cross section the equivalent of a ¼" square-design. A pressure of 4 p.s.i. has been used with Armco 17–7PH alloy .016" faces and .002" core web with cell cross section the equivalent of a ¼" square-design and with edge stiffeners to produce ¼" thick sandwich panels.

The guiding principle in applying pressure in all of the methods herein disclosed, is to exert sufficient pressure to achieve essentially continuous contact between core cell edges and face sheets without undesirably distorting or crushing the core cell edges, face sheets, or attachments.

We have found that minor discrepancies in face and core web thickness and minimum distortion in the sandwich and dies may be accommodated by utilizing a resilient metallic or non-metallic sheet 36 (FIGURE 2) or layer of temperature resistant material, such as asbestos or powdered ceramic interposed between the sandwich face and die to provide a more uniform pressure on the sandwich face throughout the braze cycle. A non-metallic layer such as asbestos sheet or powdered ceramic will minimize the possibility of stray braze material bonding the die to the sandwich face, and it may be used with all of our methods.

Where applicable, the time of the braze cycle may be substantially reduced by pre-heating the dies. While any preheating is beneficial, we have found that heating to a temperature of approximately 50° F. above brazing temperature is most desirable. Excessively high die temperatures result in overheating the sandwich and thereby cause undesirable alloy penetration by keeping the braze material molten longer than necessary. Die temperatures too close to the braze temperature unnecessarily prolong the brazing cycle.

One means for exerting pressure on the dies involves mechanical means such as a platen press, fixtures, clamps, or the like. The prepared unbrazed sandwich assembly may be placed between dies in a platen press, suitable pressure applied and the entire unit, under pressure, introduced into a brazing furnace. After the braze is accomplished, the assembly is removed from the furnace and uniformly cooled.

An equally satisfactory method involves placing a prepared unbrazed sandwich between dies in a platen press, applying necessary pressure, and heating to the braze temperatures by means of electrical resistance units in the dies. Alternatively, hydraulically actuated presses, clamps, and the like are equally suitable, to apply and maintain the desired pressure.

Figure 3:
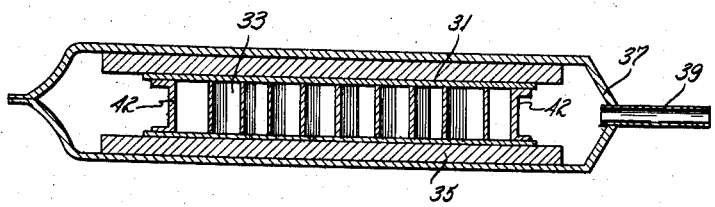
FIGURE 3 is an elevation view in section of a pair of flat dies and the sandwich enclosed in a metallic vacuum envelope in brazing position.

Atmospheric pressure may be utilized with great success in one phase of this invention, as follows: In this method a metallic envelope is provided in which the prepared unbrazed sandwich and die assembly is sealed. In FIGURE 3, the face sheets 31 are held in brazing contact with core 33 by dies 35 which are enclosed in the envelope 37. The envelope includes an evacuating tube 39 which is connected to a vacuum producing device. Core edge stiffeners 42 protect the sandwich edges from deleterious crushing. The envelope is partially evacuated to obtain the desired uniform pressure on the assembly and, while maintaining the partial vacuum, the braze cycle is carried out. Stainless steel .020" thick, and resistance welded to form a bag has been found to be satisfactory for the envelope 37. Since a high vacuum is not required, the envelope 37 need not be entirely sealed or leakproof. A resilient layer may be interposed between the dies and sandwich skins, if desired, as previously discussed. If desired, the envelope 37 may be purged with an inert gas and then partially evacuated to permit brazing under inert atmospheric conditions. In the latter case, a well sealed envelope is required.

Figure 10:
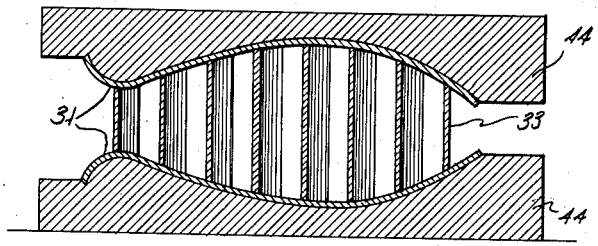
FIGURE 10 is an elevation view in section of a matched pair of curved dies and a preformed sandwich assembled in brazing position.
Figure 11:
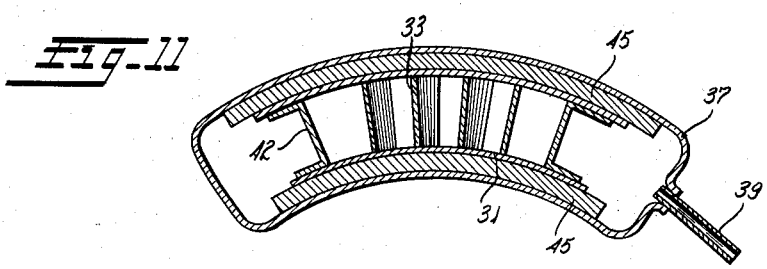
FIGURE 11 is an elevation view in section of a matched pair of curved dies and a preformed sandwich enclosed in a vacuum envelope in braze position.

The multiple die methods previously described, are equally useful in making curved sandwiches. For example, in making a curved sandwich, after the braze material and flux are placed on pre-shaped core and skin components as previously set forth, suitably shaped core edge stiffeners may be attached to the core by spot welding or the like; or the edge stiffeners may be attached to the skins. The resulting honeycomb sandwich is then pressed between dies having the desired shape of the corresponding surfaces of the finished honeycomb structure and the normal braze cycle is carried out. This method is satisfactory for curved sandwiches of non-uniform thickness. While dies of uniform thickness are most desirable, they are impractical on sandwiches of varying thickness. Thus, in FIGURE 10, the face sheets 31 of such a sandwich are shown held in brazing position with core 33 by dies 44 of varying thickness. In some instances it has been found necessary to vary die mass to obtain uniform heating. Either preheated or cold dies may also be employed in making curved sandwiches. The aforementioned means of producing pressure are suitable. Referring to FIGURE 11, for example, curved dies 45 of uniform thickness, are used in combination with a vacuum envelope 37 to hold the face sheets 31 in brazing contact with core 33.

The use of dies having different coefficients of thermal expansion has proven highly useful for making complex sandwich structures like cylinders, cones and other geometrical shapes 46, 47, 48 and 49, as diagrammatically illustrated in FIGURES 14, 15, 16 and 17.

Figure 12:
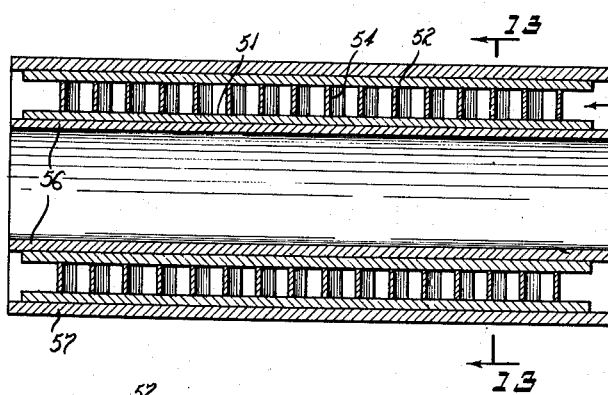
FIGURE 12 is a longitudinal view in section of a cylindrical sandwich in brazing assembly with concentric dies having different thermal expansions.
Figure 13:
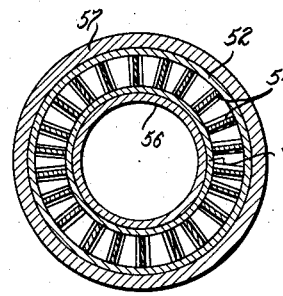
FIGURE 13 is a section view taken on line 13—13 of FIGURE 12.
Figure 14:
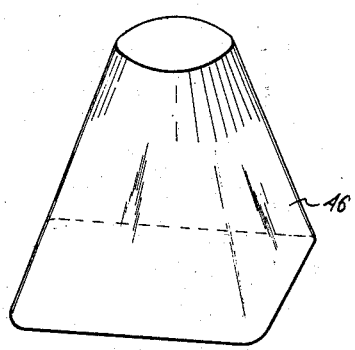
FIGURES 14–17 are diagrams of some of the various shaped tubes or ducts that can be made by the methods and apparatus of this invention.
Figure 15:
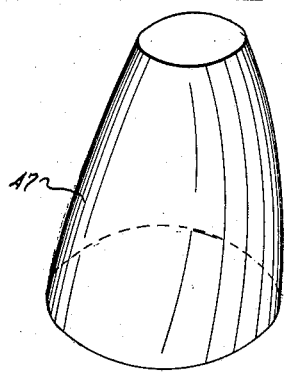
Figure 16:
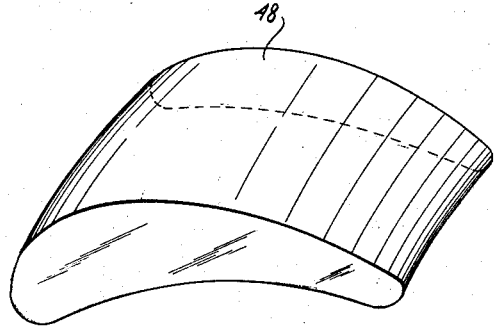
Figure 17:
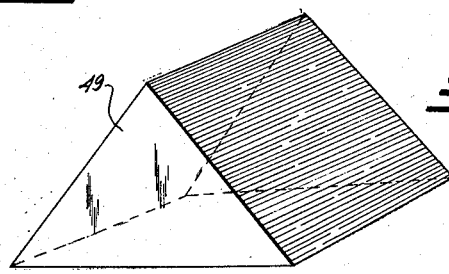

A preferred method and the apparatus used to make a honeycomb cylinder 50 with composite honeycomb wall structure is illustrated in FIGURES 12 and 13. The inner and outer cylindrical face sheets 51 and 52 are held in brazing contact with a cylindrical core 54 by the inner and outer cylindrical dies 56 and 57, respectively. In this method the inner die 56 has a greater coefficient of thermal expansion than does the outer die 57, thereby resulting in pressure on the cylindrical sandwich 50 when the assembly is heated to brazing temperature. For example, AISI type 321 stainless steel and Inconel have been successfully used for the inner and outer dies 56 and 57 respectively. The preferred steps in making a cylindrical sandwich are as follows: The outside diameter of the inner cylindrical die 56 should be slightly less than the inside design diameter of the desired sandwich 50. For example, on a die cylinder 43" in diameter, a .015 of an inch clearance has been found satisfactory for assembling sandwich and dies. After suitably cleaning the skins and core, if cleaning is necessary, the inner sandwich skin 51 is formed by rolling and joining the edges 58 as by butt welding or the like. This inner skin 51 is positioned over the inner die 56. The core 54 is formed by rolling and is welded, bonded, taped, tacked or otherwise suitably held together at the junction of the ends to form a cylinder. After applying the braze material and flux if desirable to the core cell nodes, as previously described, the core 54 is positioned over the inner skin 51 and die 56. The core and inner skin together with any desired reinforcing or auxiliary members are pinned, taped, or held by suitable means in place on the inner die 56. Next the outer skin 52 is rolled, edges 59 (FIG. 18) welded, and placed over the core 54. The outer cylindrical die 57 is formed with an inside diameter approximately .015" greater than the outside design diameter of the cylindrical sandwich 50, and placed over the assembled inner die 56, and prepared sandwich 50. The entire unit is then carried through the braze cycle. FIGURE 18 illustrates a small cylindrical section 50 made by this method.

By reason of the cylindrical shape, relatively thin dies may be employed in this method. For example, we have found .090" to be entirely satisfactory for 24" diameter cylindrical sections. This method may also be used to make tubes or ducts with other than cylindrical cross-section, such as oblates, triangles, squares, etc.

In the foregoing method, if partial cylindrical sections are desired, the components are prepared and attached as in the curved sandwich method. The prepared unbrazed sandwich unit may then be placed on the inner cylindrical die together with a filler piece or pieces of like cross section and approximately the same design thickness as the sandwich. The outer cylindrical die is slipped over the prepared sandwich and filler piece(s) and the resulting assembly put through the braze cycle.

The aforementioned method for making cylindrical sandwiches may be effectively adapted to making truncated cones, pyramids and other convergent geometrical shapes by providing means for preventing relative axial movement between the convergent dies, as shown in FIGURES 19 and 20, which illustrate an apparatus and method for making a truncated cone 60.

Referring to FIGURE 19, the preformed inner and outer face sheets 61 and 62 are held in brazing contact with a preformed core 64 by conical inner and outer dies 66 and 67, which are prevented from moving axially by the spider clamp 69. Clamp 69 comprises a central rod 70 threaded at one end 72 with a plurality of integral divergent arms 74 at its opposite end. When the inner die 66, the prepared sandwich 60 and outer die 67 are assembled, a relatively thick end plate 76 having a central threaded aperture 78 is placed adjacent the small diameter end of the outer die 67. The threaded end 72 of clamp 69 is passed through the inner die 66 and fastened by the screw threads to plate 76. The spider 69 and plate 76 are adjusted to obtain the proper axial relationship for the assembled dies and sandwich and may be locked by a nut 79 on the end 72 of rod 70. The same assembly and braze procedure is followed as in the cylinder method described in connection with FIGURES 12 and 13. Although the inner die 66 preferably has a higher coefficient of expansion than outer die 67, both may be of the same material in view of the wedging action produced by the clamp 69 and conical shape of the assembly components.

In some instances in the methods utilizing differential thermal expansion of dies, where the outer honeycomb sandwich face is sufficiently thick, it is possible to omit the outer die 57 of FIGURES 12 and 13 or 67 of FIGURES 19 and 20. For example, in making a cylindrical sandwich with an ⅛" outer face by this method, the preferred steps are as follows: Form the cylindrical outer face of the honeycomb sandwich by rolling and butt welding or the like and flux the inner surface, and form the cylindrical core. Place the braze material and flux on the core, position the prepared core on the inside of the outer face, and join the two temporarily by pins, spot welds, tape, or other suitable means. Form, flux, and place the cylindrical inner face in position. Form an inner cylindrical die from a suitable material having a greater coefficient of thermal expansion than the sandwich and place in position inside the sandwich. The resulting assembly is then put through the braze cycle. In other instances it is possible to eliminate the inner die where the inner skin has a higher rate of thermal expansion than has the outer skin, provided an outer die is utilized to retain the desired shape and form of the workpiece. These processes can also be used to make convergent tubes or ducts.

Hereinafter, reference to concentric dies or honeycomb sandwich face sheets, refers to similar shaped dies or sheets, one substantially within the other so that a fixed axis or central reference point(s) of one die or sheet is coincident with a similar fixed axis or central reference point(s) of the other die or sheet thus leaving a desired space between the outer surface of the inner die or sheet and the inner surface of the outer die, or sheet, preferably of substantially equal dimension throughout, whether the dies or sheets have a cross sectional configuration which is circular, polygonal, oblate, airfoil-shaped or such analogous shapes and whether the walls of each die or sheet are non-convergent, as in cylinders, or convergent, as in cones.

In connection with die plates having different coefficients of thermal expansion, we also propose to use two bowed die plates 75 and 76 (FIGURE 21) with a curved preformed sandwich assembly 30 clamped between them. The die plate 75 having the shorter radius will have a higher thermal expansion coefficient than plate 76, base plate 77 and clamps 78 and will be disposed against the inclined abutments 79 on the base plate in a manner permitting substantially radial movement of inner bowed die 75 relative to the outer bowed die during heating. The difference in thermal expansion of the two dies will exert a pressure on the thin face sheets 31 against the edges of the honeycomb core 33 providing the desired substantially continuous abutment between core cell edges and skin during brazing.

Figure 22:
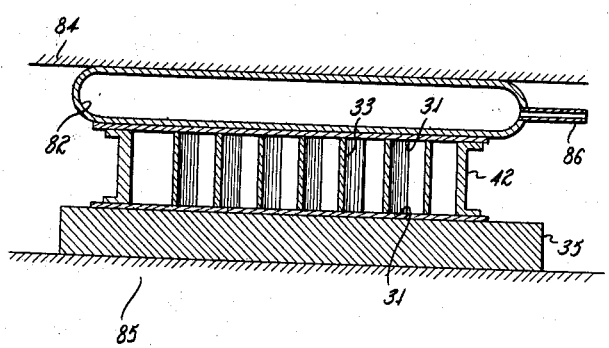
FIGURE 22 is an elevation view in section of a flat die used in combination with a fluid pressure envelope.

One phase of our invention contemplates making honeycomb sandwiches by using one die in combination with a fluid pressure container each disposed on opposite faces of the sandwich. In making a flat plane sandwich by this method, the unbrazed sandwich assembly may be prepared as in the multiple die method and is then placed between a relatively fixed die and suitable fluid pressure container like a stainless steel envelope as shown in FIGURE 22. Referring to FIGURE 22, face sheets 31 are held in brazing contact with core 33 by pressure envelope 82 and die 35 each disposed against opposed walls 84 and 85 of a rigid form. A tube 86 is fixed in envelope 82 and is connected with a source of fluid pressure. The form may be any suitable structure having relatively fixed walls 84 and 85 and is required to hold the envelope 82 and die 35 in position. Air or fluid pressure is introduced into the pressure container or envelope 82 thereby exerting pressure on the sandwich and in turn on the die 35, and such pressure is maintained throughout the braze cycle.

Figure 23:
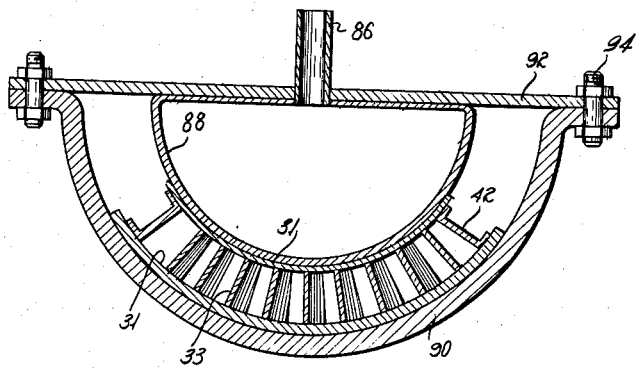
FIGURE 23 is an elevation view in section of a curved die used in combination with a fluid pressure envelope and holding plate.

Curved honeycomb sections can also be produced by this method as illustrated in FIGURE 23, wherein curved face sheets 31 are held in brazing contact with core 33 under pressure between pressure bag or envelope 88 and die 90. In this instance, a plate 92 confines the pressure envelope 88 to the die cavity thus eliminating the need of a form with relatively fixed walls. The die 90 and plate 92 are rigidly attached as by bolts 94.

Figure 24:
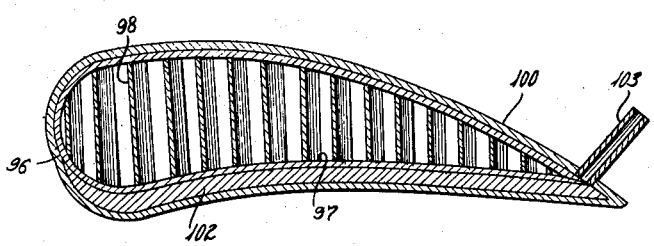
FIGURE 24 is an elevation view in section of an airfoil sandwich held in brazing assembly by a curved die and a vacuum envelope.

A modification of this die-fluid pressure method involves sealing a single die and suitably prepared unbrazed sandwich within a suitable metallic envelope. Referring to FIGURE 24, which illustrates this modification utilized in making an airfoil 96, the face sheets 97 are held in brazing contact with core 98 by envelope 100 and die 102. Tube 103, attached to envelope 100, is connected to a vacuum producing device, and the desired fluid pressure on the sandwich face opposite the die is obtained by partially evacuating the envelope. No external fixture is required in this apparatus. The envelope and contents are then taken through the braze cycle while maintaining the partial vacuum. This die-fluid pressure technique is especially useful for complex shapes such as the airfoil shown in FIGURE 24. Stainless steel .010 inch thick has been successfully used for the metallic envelope 100 used in this method.

FIGURES 25 and 26 illustrate airfoil 96 and wedge shaped sandwiches 99 made by the technique described with reference to FIGURE 24.

Another modification of the present invention is illustrated in FIGURE 27. This method involves the use of a relatively rigid die 35, a relatively flexible die such as a coat-of-mail type 104, and a fluid pressure container. The relatively flexible die 104 has metallic squares 106 spot welded to a carrier sheet 108 to form a semi-flexible unit. This relatively flexible type of die provides more uniform heating and cooling of the sandwich by providing dies of substantially equal mass on each side of the sandwich and also provides more uniform pressure on the sandwich face. Either the vacuum envelope or the pressure envelope may be used to obtain the uniform pressure on the prepared sandwich, and the entire assembly is carried through the braze cycle.

Another modification, which is particularly useful for making simple curved sandwiches, involves use of a bowed die as shown in FIGURE 28. In this method the prepared unbrazed sandwich assembly is placed over the convex side of the bowed die 110. A suitable sheet 112 is placed over the sandwich and die and held in tension by suitable means such as welding together ends 114 of sheet 112. The tension sheet 112 holds the sandwich core 33 and skins 31 in close contact, and slight bowing of the die 110 results in desirable tension in the skin sheets of the sandwich. Die 110 may advantageously be made of a metal of higher relative thermal expansion than sheet 112 or tie rod 116 so that differential expansion on heating causes pressure to be applied to the sandwich assembly, similar to the apparatus illustrated in FIGURE 21. The entire unit is then put through the braze cycle.

A modification of the bowed die apparatus and method of FIGURE 28 is illustrated in FIGURE 29. The prepared unbrazed sandwich assembly is placed over the bowed die 110, with stiffeners 42 secured to the face sheets 31 in suitable manner. Wires 116 are attached to the end edge stiffeners 42, as by welding, and the face sheets 31 are placed in tension through the stiffeners 42 by putting wires 116 under tension by suitable means like turnbuckles 118. The tension force can alternatively be provided by hydraulic or pneumatic actuators, not shown. The entire assembly is then put through the braze cycle.

Another phase of our invention involves placing one skin in tension over a die by means of a shrink fit. In making a cylindrical sandwich by this method, for example, the preferred steps are as follows: An inner cylindrical die is formed by rolling a sheet of suitable material and butt welding or otherwise fastening the ends. The inner cylindrical sandwich skin is formed by rolling and butt welding or like means. This inner skin is positioned over the die. The core is rolled and then welded, bonded, taped, or tacked at the junction of the ends to form a cylinder of appropriate size. After applying the braze material binder and flux if desirable, as previously described, the core is positioned over the inner skin and die. The outer cylindrical skin is formed so as to have an interference fit with the core. By heating the outer skin several hundred degrees F., an expansion will be obtained which permits it to be placed over the core and die assembly. Shrinking of the outer die upon cooling places the outer sandwich skin in tension and holds the sandwich assembly in brazing contact. The assembly is taken through the normal brazing cycle with the outer skin holding the assembly together in brazing contact.

Another phase of our invention contemplates the use of atmospheric pressure on both sides of the sandwich to provide the necessary holding pressure, without use of any dies. In this method which is illustrated in FIGURE 30, the prepared unbrazed assembly may be enclosed in a suitable metallic envelope 37 of stainless steel sheet or like material, and the envelope is then partially evacuated to obtain the required pressure which holds face sheets 31 in brazing contact with core 33. The envelope assembly is then put through the braze cycle while the partial vacuum is maintained. Uniform heating and cooling are required in this process to avoid distortion of the product.

A variation of this method involves the use of an envelope frame as illustrated in FIGURE 31 to reduce the likelihood of distortion. As illustrated in FIGURE 31, suitable metallic tubes 122 such as stainless steel of about the same diameter as the desired sandwich thickness are formed into a frame 124. Tubular frames provide desirable results, but angle iron, I-beams or other standard structure can be used. Flexible sheets 130 are suitably fixed, by resistance welding or the like, to the upper and lower sides of the frame 124, to complete the envelope 132. Several holes 126 provided on the inner side of the tubular frame 124 permit easy evacuation of the framed envelope 132 by the attached tube 128. The face sheets 31 of the sandwich are held in brazing contact with the core 33 by envelope 132 which is partially evacuated through connecting tube 128 and holes 126. The envelope 132 may be formed by attaching one of sheets 130 to the frame 124, placing the prepared unbrazed sandwich assembly in place, and then attaching the other sheet 130. The envelope assembly, partially evacuated, is carried through the braze cycle.

It frequently is found that a specific application of sandwich must have zones of greater strength, for example, along edges, or where fittings such as doublers, channels, grommets, brackets, lugs, and the like are to be attached. We have evolved several methods for solving this problem satisfactorily.

Figure 32:
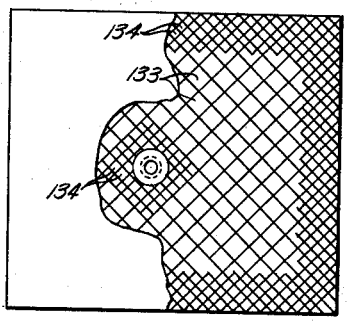
FIGURE 32 illustrates a structure having more compact grouping of core cells along sandwich edges and at positions where fittings are attached.

As shown in FIGURE 32, one method of strengthening the assembly is to provide more compact or higher core cell density in the desired zones. The main body of quarter-inch core cells 133, for example, may have walls composed of .002" ribbon material, while the dense, selected zones of core cells 134 are composed of .002" ribbon formed into eighth-inch cells. Thus the portions of cellular core with higher density, which would be disposed in the composite sandwich assembly at zones where greater strength is desired, would be prefitted with face sheets, as for example the doublers 25 in FIGURE 9, and combined with the main core portions within the face sheets of the assembled sandwich structure.

Figure 33:
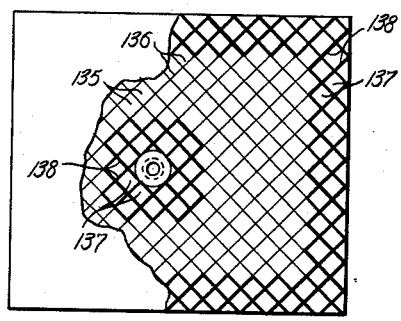
FIGURE 33 illustrates a structure having core cell walls of heavier material along sandwich edges and at positions where fittings are attached.

A second satisfactory method of locally strengthening a sandwich assembly, as shown in FIGURE 33, is to provide core of the same cell size, but of heavier material in the desired areas. For example, the main core body may be quarter-inch cell 135 of .002" ribbon material 136, while the stressed areas may be of quarter-inch cell 137 of .005" ribbon 138.

Of course, many combinations of material thickness and cell size are possible, and we have experienced no difficulty in obtaining complete bonding of the varied core areas to each other and to the covering skins and other components when using methods and apparatus disclosed herein. Other uses and advantages of such combination sandwiches include: Stabilization of faces for fastening doublers, fittings etc., to keep the face flat for good bonding by eliminating dimpling which prevents brazing. This further makes possible application of extra pressure in using the methods herein disclosed, to insure bonding in local areas.

*Semi-Continuous and Continuous Processes*

All of the aforementioned methods of making honeycomb sandwich involve batch type processes which are inherently slower and more costly than the semi-continuous and continuous processes which we have developed as one phase of our invention and which will now be disclosed and discussed.

The basic principle involves providing relative motion between the brazing facility and the all-metal sandwich assembly to be brazed to achieve semi-continuous or continuous production of brazed honeycomb sandwich structures.

Such relative motion may be achieved either by holding the work-piece stationary and providing a traveling furnace, or conversely by feeding the unbrazed sandwich assembly through a stationary furnace. Each of these approaches has been proven satisfactory for certain applications when utilized with our developed procedures.

Figure 34:
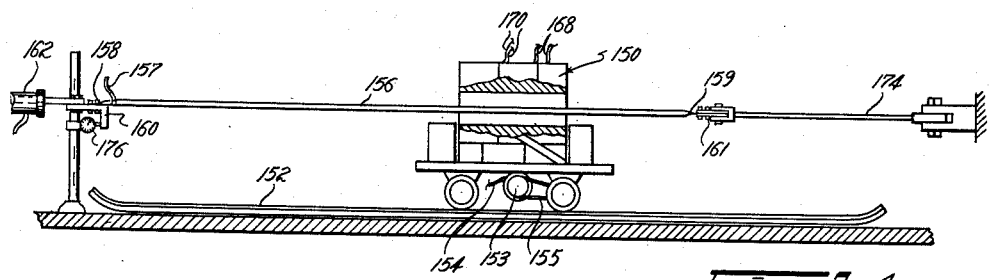
FIGURE 34 illustrates an apparatus utilizing a traveling furnace for producing semi-continuous strips of honeycomb sandwich.
Figure 35:
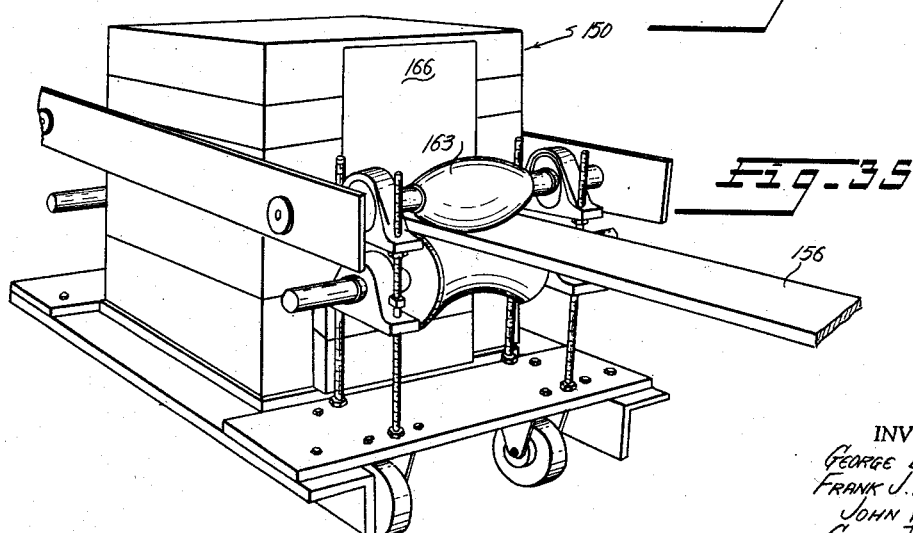
FIGURE 35 is an enlarged perspective view of the furnace of FIGURE 34, showing a set of rollers used to produce curved sandwich structure.

Referring now to FIGURES 34 and 35, there is shown a traveling furnace 150 for brazing long, narrow honeycomb sandwich panels 151 (FIGURE 36), which is particularly effective. Movement of the furnace 150 along a track 152 aligned with the panel assembly 151 is controlled by any suitable means such as, for example, an electric motor 153 with power lead 154 and necessary gears or chain drive 155.

An essential feature of this embodiment, as in other embodiments, is to maintain the components of the unbrazed sandwich in firm contact throughout the brazing cycle. This is accomplished in the present embodiment by either of several means.

(1) The unbrazed panel assembly 151 may be enclosed in a metallic bag 156, as shown in FIGURES 34–36, which is partially evacuated through tube 157 and maintained under stretch tension as brazing heat is applied. As can be seen in FIGURE 34, the ends 158, 159 of the bag 156 are attached to brackets 160 and 161 and may be drawn into tension by a hydraulic ram arrangement 162. In the specific arrangement shown in FIGURE 35, a curved panel was desired. Therefore the furnace 150 was provided with matched pairs of curved rollers 163 and 164 at furnace inlet and outlet. Baffle sheets 166 of asbestos or the like are provided at the furnace inlet and outlet, to reduce airflow through the furnace.

The furnace may be heated by electricity through power leads 168 (FIGURE 34) with temperature being controlled by a thermostatic arrangement 170. Power leads 154 and 168 and thermostat leads 170 may be connected to a slide rail arrangement or connected directly to a control panel with sufficient lead length to permit desired maximum furnace travel.

In operation, the core and face sheets are assembled as described supra, and the sandwich 151 introduced into the metallic bag 156. In general practice, the bag 156 is preferably formed around the assembled sandwich 151. A heavy extension plate 174 is provided on bracket 161 to which the bag 156 is attached, with the other end of bag 156 attached to the bracket 160. This provides a region where the furnace 150 may be held in an idle condition with no danger from excessive heat being applied to the sandwich assembly.

When the bag 156 has been attached at each end to the clamping brackets 160 and 161, and is being maintained under stretch tension and partially evacuated, a given tension may advantageously be applied to plastically stretch the bag 156 a definite amount, say ½ to 2%. This operation serves to "stretch-level" the bag, making it straight and true. The sandwich assembly is also benefited because the skins or face sheets are thereby placed under tension and surface undulations smoothed out. Thus the evacuated bag or envelope accomplishes the pressure function, provides a straight level platform and smooths out surface undulations in the sandwich face sheets.

If the bag or envelope comprises the skins of the sandwich itself, this "stretch-leveling" action is even more effective. Where heavy sandwich skins are being used, say greater than 0.020", this permanent elongation by cold stretching the entire assembly is considered very important.

With the bag 156 in tension, the motive mechanism is started and the traveling furnace 150 moves along its guide track 152, which is aligned with the bag assembly, and brazing takes place progressively. Rate of travel of the furnace 150 is predetermined to assure progressive portions of the panel 151 being subjected to furnace temperature for sufficient itme to complete melt and flow and allow time for a controlled diffusion of braze material with core and face sheets.

As the furnace 150 travels along the track 152, the forward pair of rollers 163 and 164 forms the bag and panel assembly 156 into the desired arcuate shape cross-section prior to brazing. The pair of matched rollers at the outlet end of the furnace maintains this desired shape in the panel during the heat-up brazing, and short follow-up period necessary for the braze to solidify and so unite the assembly into a rigid sandwich structure. During brazing, a controlled tension force is maintained. It has been determined that slight elongation of the sandwich assembly is desirable and conditions to produce ½% stretch have been found satisfactory. The dial indicator 176 (FIGURE 34) indicates this overall amount of stretch and thus establishes the tension force required.

This stretched, evacuated envelope with traveling tunnel furnace has proved to be an ideal apparatus for accomplishing honeycomb sandwich by the method of this invention. The envelope, being relatively light, does not soak up heat and with the traveling furnace gives excellent control over the time interval necessary to introduce and remove heat for optimum brazing results without permeating the core and skins.

As discussed supra, asbestos sheets may be utilized to preclude possibility of the bag becoming attached to the sandwich. Also, it should be recognized that intermediate rollers eithers in matched pairs, or as supports, may be utilized in the furnace proper if desired.

(2) When it is desired to utilize the above-described traveling furnace to braze comparatively small unit sandwich assemblies 180, a single sheet 182 (FIG. 38) or a pair of matched tension sheets 184, 185 may be provided as to serve a rack holding the unbrazed assemblies. The units may be provided with individual metallic vacuum bags 186, which are preferably partially evacuated prior to the brazing cycle. If a double sheet arrangement is used, the sheets 184, 185 may be placed under stretch tension, with the assembled sandwich work-piece 180 between the sheets, and thus the work-piece components will be held in close contact during brazing. However, frequently it will be found that sealing of the individual work-piece assemblies in separate metallic bags 186 and maintaining partial evacuation of the bags will provide controlled force on the assemblies during the brazing cycle. Assemblies may be deposited on a single sheet rack 182 with a tension hold down sheet 188 as shown in FIGURE 38 to provide means for holding the assembly in proper contact; or the assembly, in an evacuated bag or clamped die assembly, can be placed on a single level sheet rack.

In operation with a single level rack, the furnace 150 travels backward and forward with brazed work-pieces removed and replaced by assembled but unbrazed work-pieces preassembled with clamped dies and/or envelopes as previously described, as a continuous operation.

In some instances where difficulty is experienced in holding a long or complex assembled but unbrazed work-piece in a horizontal position, successful brazing has been accomplished by the method shown in FIGURE 39, in which the work-piece 190 is maintained in an upright position with the traveling furnace 150' sliding on suitable tracks (not shown) from top to bottom or from bottom to top. This system is particularly well adapted for the brazing of truncated cone or cylindrical assemblies and other large sections which are best held in an upright position during the brazing cycle.

We have achieved continuous production of honeycomb sandwich 139 by providing unique means of holding the core and skins together while brazing is accomplished. FIGURE 41 is a perspective view of one such continuous device generally indicated at 140. The apparatus consists of structural framework enclosing a built-up arrangement of insulated blocks 141 and heating, pressing and guiding rolls. Referring to the schematic showing in FIGURE 42 the device of FIGURE 41 consists essentially of four sets of rolls although a different number could be used. In the preferred embodiment of this device, the parts are as follows: The first roller set 142 is for positioning and guiding face sheets 31 and core 33, which are supplied to the unit in continuous strips. The facing sheets may be supplied from rolls of proper width sheet material and the honeycomb core may be supplied from a fabricating apparatus. Braze material and flux is applied to core edges prior to being fed between the face sheets 31 by continuous application methods such as rolls, brushes or by dipping. Rolls 144 may have a slightly higher peripheral speed than rolls 142 to create a tension on the face sheets between roll set 142 and roll set 144. The second set of rolls 144 is for brazing and maintaining the proper pressure on the honeycomb sandwich, and is heated by suitable means such as radiant gas heaters. The next set of rolls 146 is for cooling and is driven slightly faster than the brazing pressure rolls 144. The next set of rolls 148 guides and further cools the brazed sandwich. Rolls 146 and 148 may be water cooled and are driven at the same speed.

The sequence of operations is as follows: Core 33 prepared with braze, binder and flux if desirable, is placed between fluxed face sheets 31 and passed through the positioning rolls 142 which press the face sheets 31 to the core 33. The brazing rolls 144 quickly and uniformly heat the sandwich to brazing temperature while maintaining appropriate brazing pressure. The braze rolls 144 also pull the sandwich from the positioning rolls 142. The cooling rolls 146 quickly and uniformly cool the sandwich, maintain proper pressure for brazing contact, and maintain a slight tension on the sandwich since they are driven faster than the brazing rolls 144. The guide rolls 148 remove heat from the sandwich structure and prevent distortion. The apparatus of FIGURES 41 and 42 has been used at feed speeds ranging from 1 to 10 feet per minute, and feeds of 4 feet per minute are generally most desirable. Too high a rate of speed results in spotty brazing while too slow a speed may cause overheating of the sandwich.

Brazing roll temperatures ranging from 50° F. to 200° F. above the melting point of the braze material have been used with successful continuous brazing results.

As important advantage of this continuous unit is that it can braze extremely high temperature braze material, in the range of 2300° F. for example, with little alloy penetration of the sandwich material because the temperature is raised and lowered quickly. Other methods can result in the molten braze material being in high temperature contact with the base metal long enough to allow excessive penetration.

Referring to FIGURE 43, it will be seen that curved continuous sandwiches may be produced with this device by merely changing the position of the cooling rolls 146 and guide rolls 148 to achieve the desired curvature. Positioning rolls 142 may also be changed to provide initial curvature to the honeycomb strip if desired.

Referring again to FIGURES 41 and 42, it will be appreciated that the pairs of rollers 142, 144, 146 and 148 are not necessarily cylindrical as shown, but may be of matched curved configuration as are rollers 162 and 164 (FIGURE 35) to impart a desired transverse curvature to the unbrazed sandwich assembly, and maintain said curvature during brazing and subsequent cooling.

In lieu of using heated rollers 144, the positioning rolls 142', pressure rollers 144' and guide rollers 146' can be located inside a stationary brazing furnace 200, as shown schematically in FIGURE 40, to provide apparatus for producing continuous honeycomb sandwich 139.

It is evident from the foregoing that the present inventions provide various novel pressure and like methods for forming high strength—high temperature honeycomb structures in which the cores are bonded to the face skins by brazes and like intermetallic bonds, with substantially continuous connections between the core edges and the face skins; that such novel methods include batch processes and continuous production processes; and that such methods can be effectively used to form complex honeycomb shapes which could not be produced by practices heretofore known. It is further apparent that the present invention provides various novel effective apparatuses and means for carrying out the novel methods of this invention. It is also evident that the novel methods and apparatuses disclosed herein produce a new improved virtually monolithic all-metal honeycomb product, in either simple or complex shapes, of a type not heretofore feasible in commercial production and particularly suited for high temperature-high strength applications.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of producing a composite thin metal honeycomb sandwich structure having a strong cohesive substantially uniform continuous bond between the edges of the honeycomb core cells and the adjacent surface of the sandwich skin comprising the steps of preforming the honeycomb core and thin skins for each side of the core, placing the appropriate skins on each side of the honeycomb core with a proper amount of suitable cohesive fusible bonding material, enclosing the unbonded sandwich structure within a sealed envelope, partially evacuating the sealed envelope, placing the sealed envelope and sandwich structure between two tension members to exert tension forces on the envelope tending to force the envelope walls which are adjacent the sandwich skins toward each other, whereby substantially complete contact between the entire extent of the cell edges of the two faces of the honeycomb core and the entire respective adjacent surfaces of the thin metal skins is obtained, positioning said assembly of tension members, sealed envelope and sandwich structure through a tunnel furnace and causing relative motion between furnace and said assembly whereby cohesive bonding of said sandwich structure is progressively obtained.

2. A method of making a strip of composite metallic honeycomb sandwich structure having a strong cohesive substantially uniform continuous bond between the edges of the honeycomb core and the adjacent surface of the sandwich skin comprising the steps of preassembling strips of honeycomb core, thin facing sheets and a proper amount of suitable cohesive fusible bonding material, creating tension on and compressive force between said facing sheets, whereby a substantially complete contact between edges of the two sides of the honeycomb core cells and the respective adjacent surfaces of the thin facing sheets is achieved, creating relative motion between a localized source of heat and said strip whereby progressive cohesive bonding is accomplished, and progressively forming and maintaining said strip with a transverse curvature during said relative motion.

3. An apparatus for accomplishing progressive bonding of composite honeycomb sandwich structure comprising means for maintaining preassembled honeycomb sandwich structure under sufficient pressure to assure intimate contact between the facing sheets and the honeycomb cell edges whereby a uniform continuous cohesive fusible bond may be accomplished between the honeycomb core cell edges and the facing sheets, and a movable furnace device adapted to surround and progressively pass over the preassembled honeycomb sandwich structure, to progressively cause cohesive fusible bonding of said structure, said furnace device having inlet and outlet openings and matched sets of contour forming rollers disposed at said inlet and outlet and adapted to engage and form a desired transverse configuration in said honeycomb sandwich structure as said furnace progressively passes over and bonds the preassembled honeycomb sandwich structure.

4. An apparatus for accomplishing progressive bonding of composite honeycomb core sandwich structure comprising: an elongate envelope means including an envelope structure for enclosing and maintaining a preassembled honeycomb sandwich structure under sufficient uniform pressure to assure intimate substantially complete contact between the honeycomb face sheets and core cell edges whereby a uniform cohesive fusible bond may be accomplished between the honeycomb core cell edges and the facing sheets; said envelope means including a tension device exerting tension force on said envelope structure along its elongate axis; a tunnel furnace device adapted to provide an annular heat zone around the elongate envelope structure; and means between said furnace device and said envelope means for causing relative movement of said furnace device and said envelope structure so the annular zone of heat causes progressive cohesive fusible bonding along the preassembled sandwich structure within said elongate envelope structure.

References Cited in the file of this patent

UNITED STATES PATENTS

| | | |
|---|---|---|
| 385,783 | Whiting | July 10, 1888 |
| 620,133 | Horgan | Feb. 28, 1899 |
| 1,247,250 | Field | Nov. 20, 1917 |
| 1,651,403 | Mougey | Dec. 6, 1927 |
| 1,840,724 | Koehring | Jan. 12, 1932 |
| 1,863,073 | Smythe | June 14, 1932 |
| 2,093,814 | Mann | Sept. 21, 1937 |
| 2,398,175 | Woods | Nov. 20, 1945 |
| 2,424,878 | Crook | July 29, 1947 |
| 2,452,284 | Beare | Oct. 26, 1948 |
| 2,609,068 | Pajak | Sept. 2, 1952 |
| 2,614,517 | Peterson | Oct. 21, 1952 |
| 2,654,686 | Hansen | Oct. 6, 1953 |
| 2,686,957 | Koerper | Aug. 24, 1954 |
| 2,700,632 | Ackerlind | Jan. 25, 1955 |
| 2,713,196 | Brown | July 19, 1955 |
| 2,720,948 | Pajak | Oct. 18, 1955 |
| 2,720,949 | Pajak | Oct. 18, 1955 |
| 2,722,735 | Beamish | Nov. 8, 1955 |
| 2,742,387 | Giuliani | Apr. 17, 1956 |
| 2,778,458 | Briggs | Jan. 22, 1957 |
| 2,816,355 | Herman | Dec. 17, 1957 |
| 2,845,698 | Giovannucci et al. | Aug. 5, 1958 |

FOREIGN PATENTS

| | | |
|---|---|---|
| 144,316 | Germany | Sept. 19, 1903 |